United States Patent
Van Baar

(10) Patent No.: US 9,945,107 B2
(45) Date of Patent: Apr. 17, 2018

(54) ODOUR TRAP AND SYSTEM OF A TRANSPORT CONDUIT WITH A DIVISION INTO A MAIN BRANCH AND A SIDE BRANCH AND SUCH AN ODOUR TRAP

(71) Applicant: Intelligent Environmental Systems B.V., Alkmaar (NL)

(72) Inventor: Jacobus Eldert Maria Van Baar, Bergen (NL)

(73) Assignee: Intelligent Environmental Systems B.V., Alkmaar (NL)

( * ) Notice: Subject to any disclaimer, the term of this patent is extended or adjusted under 35 U.S.C. 154(b) by 12 days.

(21) Appl. No.: 14/960,074

(22) Filed: Dec. 4, 2015

(65) Prior Publication Data

US 2016/0201308 A1    Jul. 14, 2016

(30) Foreign Application Priority Data

Jan. 13, 2015 (NL) ..................... 2014127

(51) Int. Cl.
*F16K 15/14* (2006.01)
*F16K 31/126* (2006.01)
(Continued)

(52) U.S. Cl.
CPC .............. *E03C 1/28* (2013.01); *E03F 7/04* (2013.01); *F16K 15/031* (2013.01); *F16K 15/147* (2013.01)

(58) Field of Classification Search
CPC .......... E03C 1/281; E03F 7/04; F16K 15/145; Y10T 137/2544; Y10T 137/7771;
(Continued)

(56) References Cited

U.S. PATENT DOCUMENTS 3,431,945 A * 3/1969 Robillard .................. E03F 7/02
138/90
3,460,558 A * 8/1969 Johannisson ....... A61M 16/208
137/102
(Continued)

FOREIGN PATENT DOCUMENTS

EP        1255065 A1    11/2002
EP        2706157 A1    3/2014
(Continued)

OTHER PUBLICATIONS

Dutch Search Report in NL 2014127, dated Sep. 15, 2015.

*Primary Examiner* — Seth W Mackay-Smith
(74) *Attorney, Agent, or Firm* — Oppedahl Patent Law Firm LLC

(57) ABSTRACT

The invention relates to an odor trap (31) for a transport conduit (10) with a division into a main branch (11) and a side branch (12). The odor trap comprises a mounting part (32) for releasable mounting in the side branch, and a membrane (33) of elastic material which comprises a first membrane part (33) to be received in the side branch (12) and a second membrane part (34) to be received in the main branch (11). The second membrane part (34) lies at an angle relative to the first membrane part (33).
The membrane is at least partially movable under pressure of a fluid from a closing position, in which the membrane closes the passage of the main branch to the fluid, to a position allowing passage in which the membrane leaves clear the passage of the main branch for the fluid.
The invention also relates to a system of a transport conduit (10) with a division into a main branch (11) and a side branch (12) and an odor trap (1) according to the invention.

11 Claims, 7 Drawing Sheets

(51) Int. Cl.
  *E03C 1/28* (2006.01)
  *E03F 7/04* (2006.01)
  *F16K 15/03* (2006.01)

(58) Field of Classification Search
  CPC ....... Y10T 137/7836; Y10T 137/87788; Y10T 137/87804
  See application file for complete search history.

(56) References Cited

U.S. PATENT DOCUMENTS

| | | | |
|---|---|---|---|
| 4,870,992 A * | 10/1989 | Irwin | E03C 1/298 137/362 |
| 5,033,504 A * | 7/1991 | Kallenbach | F16K 15/147 137/493.1 |
| 5,234,018 A * | 8/1993 | Grachal | E03C 1/122 137/244 |
| 5,558,131 A * | 9/1996 | Cohee | F16L 55/128 137/225 |
| 5,769,125 A | 6/1998 | Duer et al. | |
| 6,516,832 B1 * | 2/2003 | Myers | E03B 7/003 138/93 |
| 6,748,973 B2 * | 6/2004 | Lindroos | F16K 11/027 137/605 |
| 2002/0174892 A1 | 11/2002 | Lindroos | |
| 2009/0152480 A1 * | 6/2009 | Savaria | E03F 7/00 251/12 |
| 2010/0193040 A1 | 8/2010 | Bruno | |

FOREIGN PATENT DOCUMENTS

| | | | |
|---|---|---|---|
| SE | 320240 | * | 2/1970 |
| SE | 320240 B | | 2/1970 |
| WO | 2009004464 A1 | | 1/2009 |

* cited by examiner

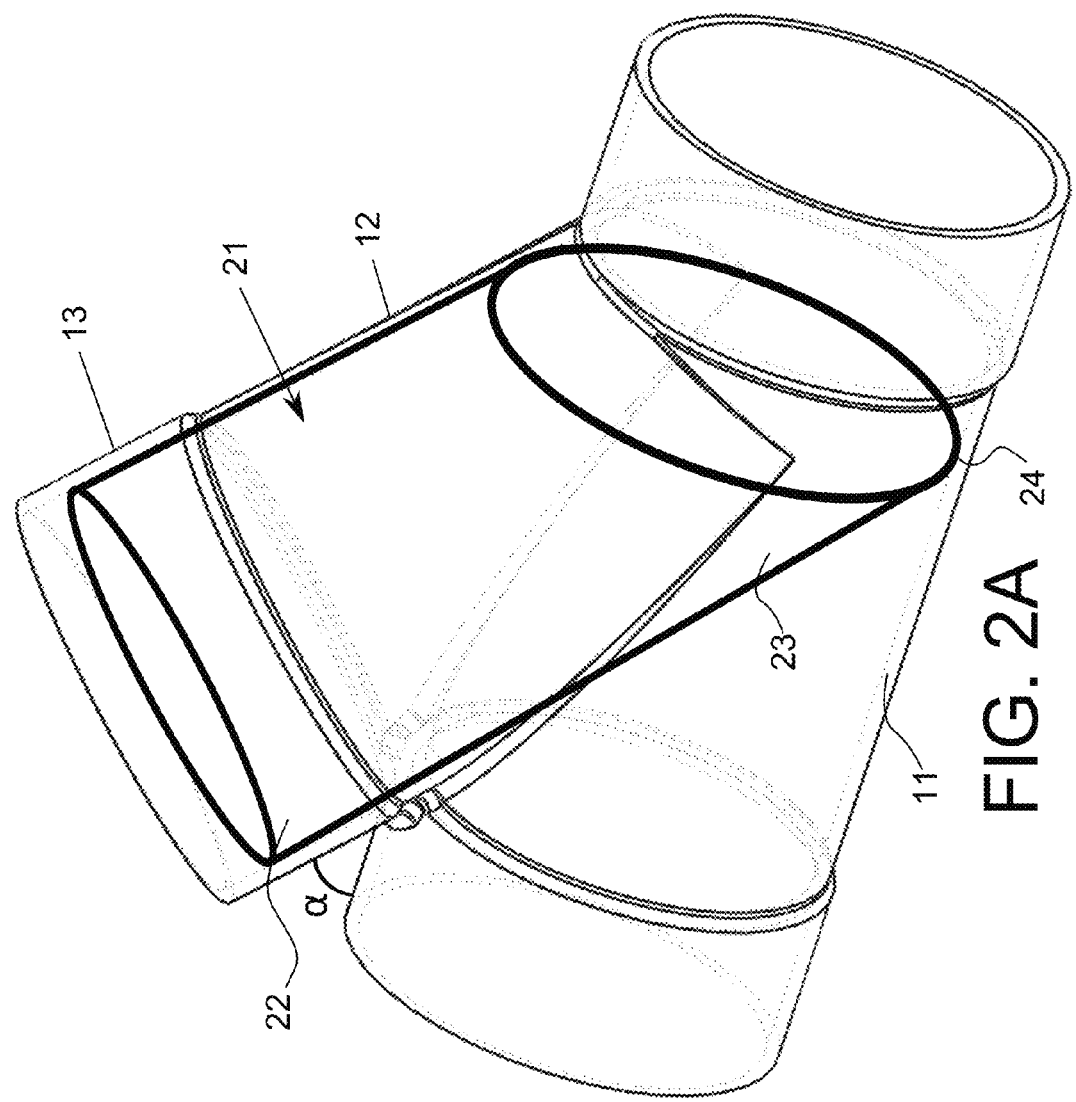

ODOUR TRAP AND SYSTEM OF A TRANSPORT CONDUIT WITH A DIVISION INTO A MAIN BRANCH AND A SIDE BRANCH AND SUCH AN ODOUR TRAP

The present invention relates to an odour trap for a transport conduit for a fluid.

Diverse odour traps are known in the relevant field. Several examples are non-return valves for sewer pipes or a siphon with a water seal.

The present invention has for its object to provide an improved odour trap.

The odour trap according to the invention has for this purpose the distinguishing measures that the odour trap is suitable for a transport conduit with a division into a main branch and a side branch, wherein the odour trap comprises a mounting part which is configured for releasable mounting in the side branch, and a membrane of elastic material which is arranged on an end of the mounting part to be oriented toward the main branch, wherein the membrane is at least partially movable under pressure of a fluid from a closing position, in which the membrane closes the passage of the main branch to the fluid, to a position allowing passage in which the membrane leaves clear the passage of the main branch for the fluid.

In the position of use the odour trap according to the invention remains easy to reach via the side branch and can thus be removed in simple manner for repair or replacement.

An odour trap according to the preamble of claim 1 is known from EP1255065 and from SE320240. The known odour trap comprises a tubular membrane.

The odour trap according to the invention is distinguished from the known odour trap in that the membrane comprises a first membrane part to be received in the side branch and a second membrane part to be received in the main branch, wherein the second membrane part lies at an angle relative to the first membrane part, which angle is substantially equal to an angle between the side branch and the main branch.

The odour trap according to the invention is suitable to be received in a version of a transport conduit with division which is very common in the field, i.e. with a straight side branch which lies at an angle to a horizontally running main branch. This is a significant advantage relative to the known odour trap, which is only suitable for accommodation in a transport conduit with bends in the main branch and/or the side branch. Bends in a transport conduit are however undesirable in respect of accumulation of waste.

In the position allowing passage the odour trap provides an optimal passage to the fluid in the main branch, since the membrane can be received partially in the opening to the side branch. Because of the movable membrane no accumulation of waste will take place in the main branch. The production costs of the odour trap according to the invention are moreover low.

In an extra-reliable preferred embodiment the membrane is provided at an end remote from the mounting part with a collar, which in the closing position lies substantially sealingly against the inner wall of the main branch. In the closing position the collar preferably extends substantially concentrically in the main branch.

In an elegant preferred embodiment the shape of the first and/or second membrane part is substantially tubular. In a practical preferred embodiment the shape of the mounting part corresponds at least partially to the shape of the side branch. According to a further practical preferred embodiment, the shape of the membrane corresponds at least partially to the shape of the main branch. The mounting part and the membrane are preferably generally tubular. In this preferred embodiment the odour trap is suitable for use in common, generally tubular transport conduits such as tubes and pipes.

In a manageable preferred embodiment the odour trap is formed integrally. The odour trap can then be removed quickly for repair or replacement.

The wall thickness of the membrane is preferably smaller than the wall thickness of the mounting part. The thinner membrane is flexible and is supported by the thicker mounting part, which imparts strength to the odour trap.

In a wear-resistant preferred embodiment the membrane and/or the mounting part comprise a flexible material such as polyurethane or rubber.

According to an elegant preferred embodiment, the mounting part is provided at an end to be oriented away from the main branch with mounting means for co-action with a closing cap of the side branch. The mounting means preferably comprise a sealing ring. In this preferred embodiment the odour trap can be easily mounted in rapid and reliable manner in the position of use.

The invention also relates to a system of a transport conduit with a division into a main branch and a side branch and an odour trap according to the invention, wherein the angle between the side branch and the main branch is greater than 0 and less than or equal to 90 degrees.

The invention will now be discussed in more detail with reference to the drawings, in which FIG. 1A shows schematically the operation of an odour trap according to the invention in a closing position;

FIG. 2A shows a first preferred embodiment of the odour trap according to the invention in the closing position;

FIG. 1A and FIG. 1B illustrate schematically the operation of an odour trap according to the invention.

FIG. 1A shows a system of a transport conduit 10 and an odour trap 1 according to the invention in the closing position and FIG. 1B shows the system of FIG. 1A in the position allowing passage.

Figure 1A:
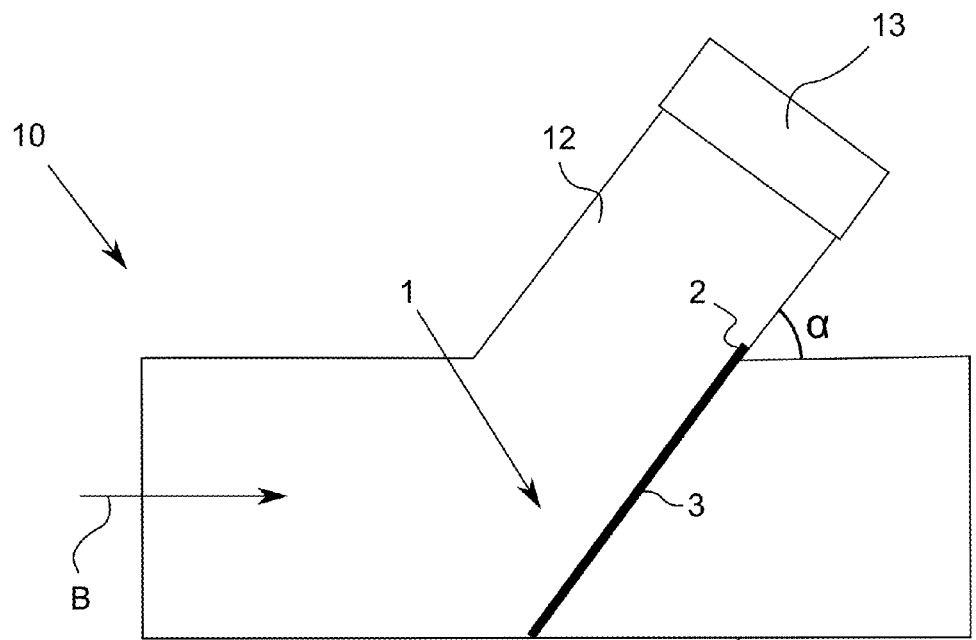

Transport conduit 10 is provided with a division into a main branch 11 and a side branch 12. The angle α between side branch 12 and main branch 11 is greater than 0 and less than or equal to 90 degrees. Such a division is known in the relevant field as a Y-junction or a T-junction. In the shown preferred embodiment the transport conduit serves as outlet pipe for liquid drainage, for instance as part of a connection to a sewer system.

Odour trap 1 comprises a mounting part 2 configured for releasable mounting in side branch 12. Mounting part 2 extends substantially in side branch 12.

Figure 1B:
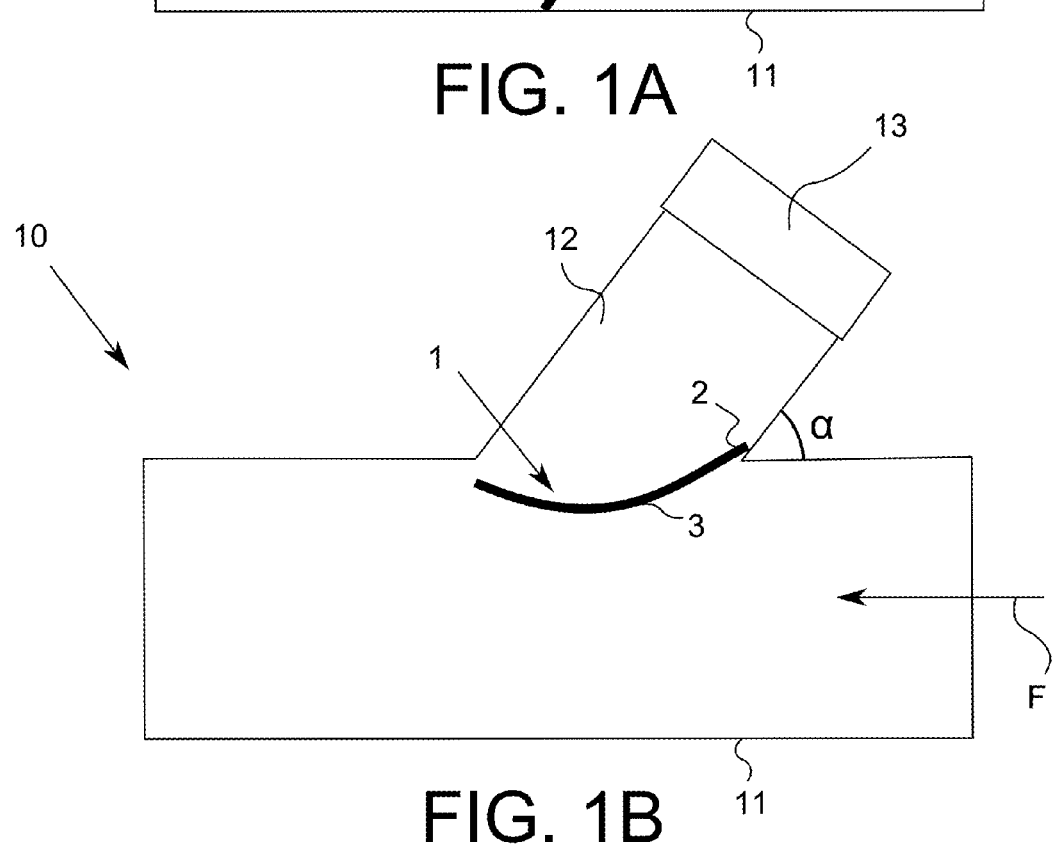
FIG. 1B shows schematically the operation of the odour trap of FIG. 1A in a position allowing passage.

Odour trap 1 further comprises a membrane 3 of elastic material which is movable between the closing position shown in FIG. 1A and the position allowing passage shown in FIG. 1B under pressure of a fluid flowing through main branch 11. In the closing position membrane 3 extends substantially obliquely into main branch 11 and is configured to close the passage of main branch 11 to the fluid flowing in direction B. The shape of membrane 3 is such that the free end remote from mounting part 2 lies at least partially sealingly in peripheral direction against the inner wall of main branch 11.

Under pressure of fluid flowing in direction F membrane 3 moves toward the side branch opening and leaves the passage of main branch 11 substantially clear. In the position allowing passage membrane 3 extends substantially in longitudinal direction of main branch 11 at the position of the side branch opening.

Figure 2B:
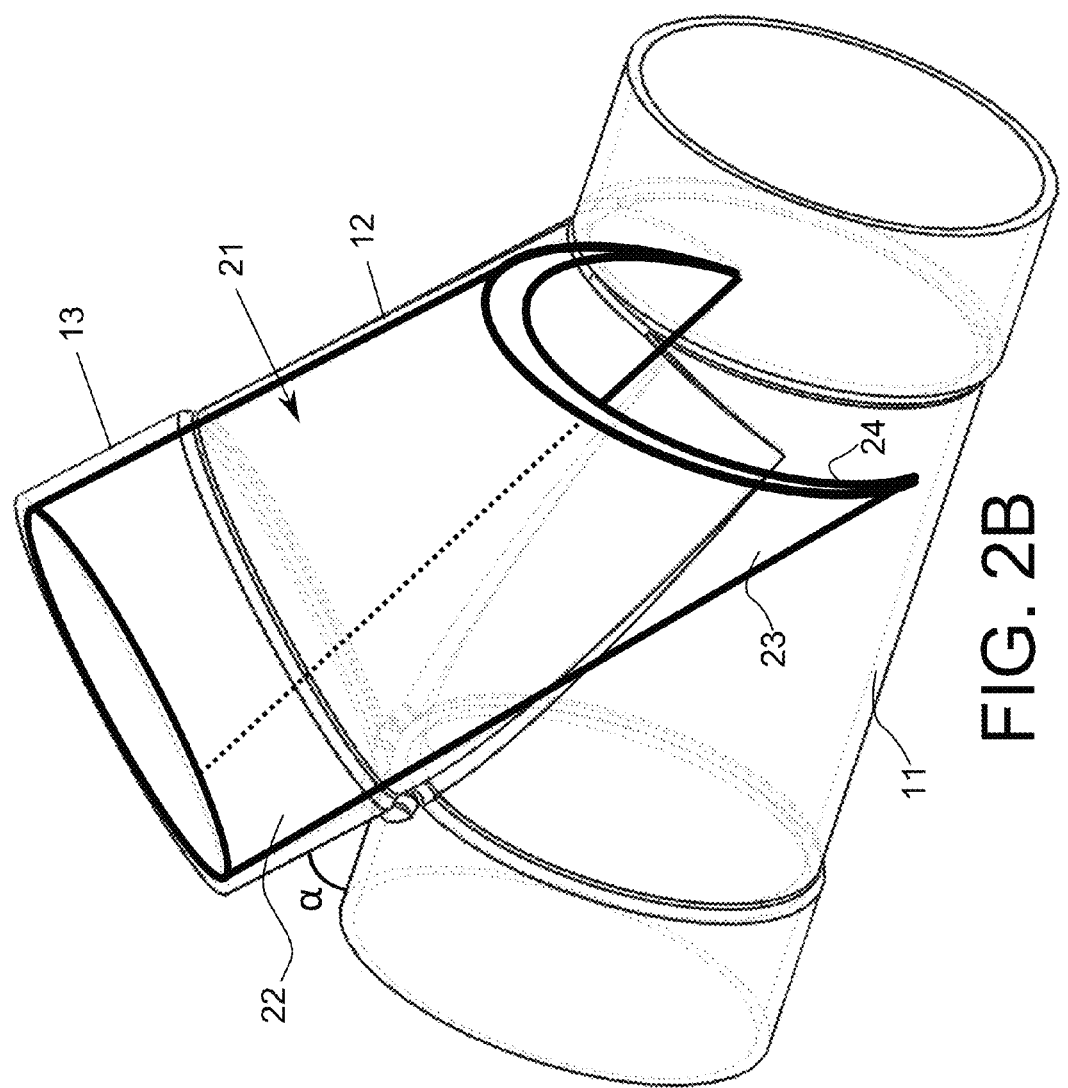
FIG. 2B shows the odour trap of FIG. 2A in the position allowing passage.
Figure 4A:
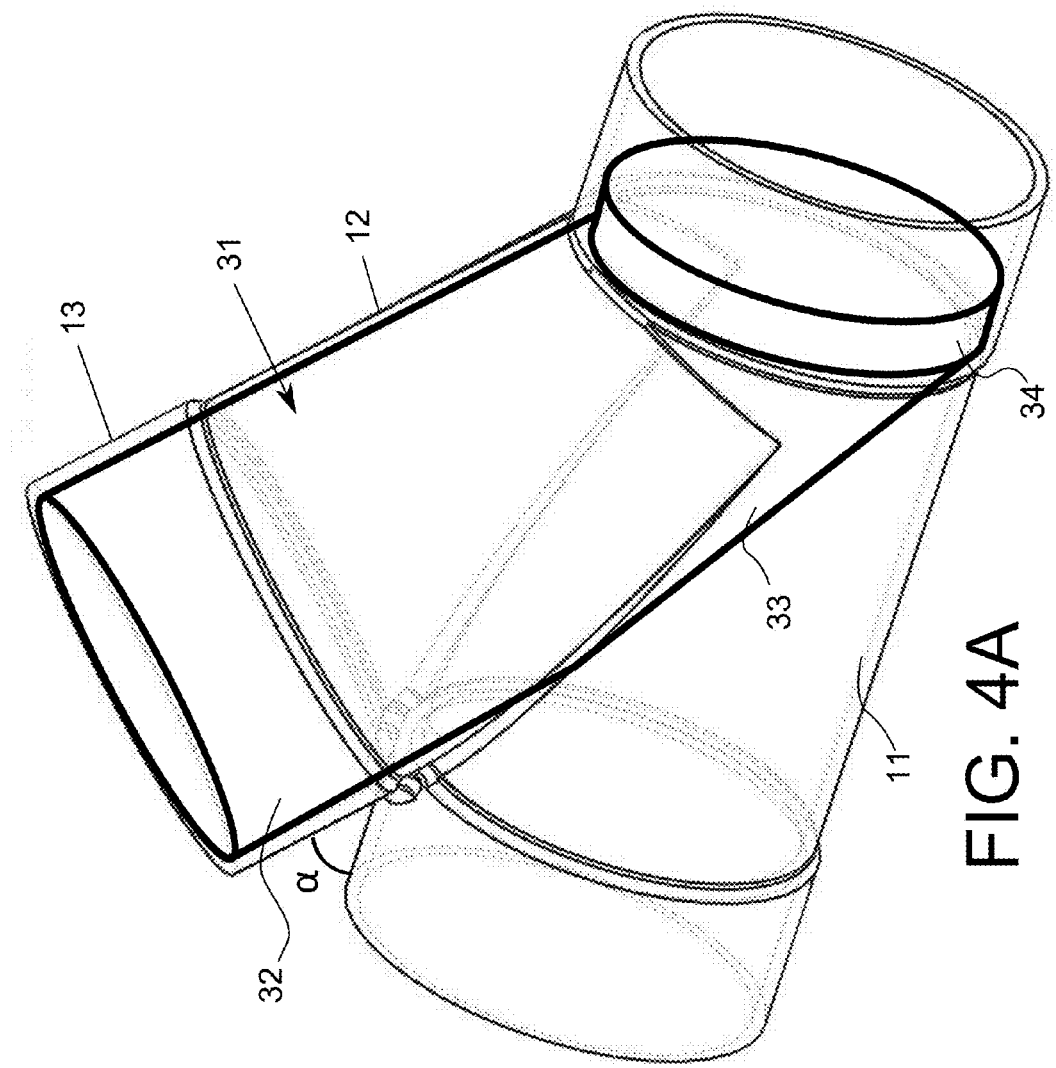
FIG. 4A shows a second preferred embodiment of the odour trap according to the invention in the closing position.
Figure 4B:
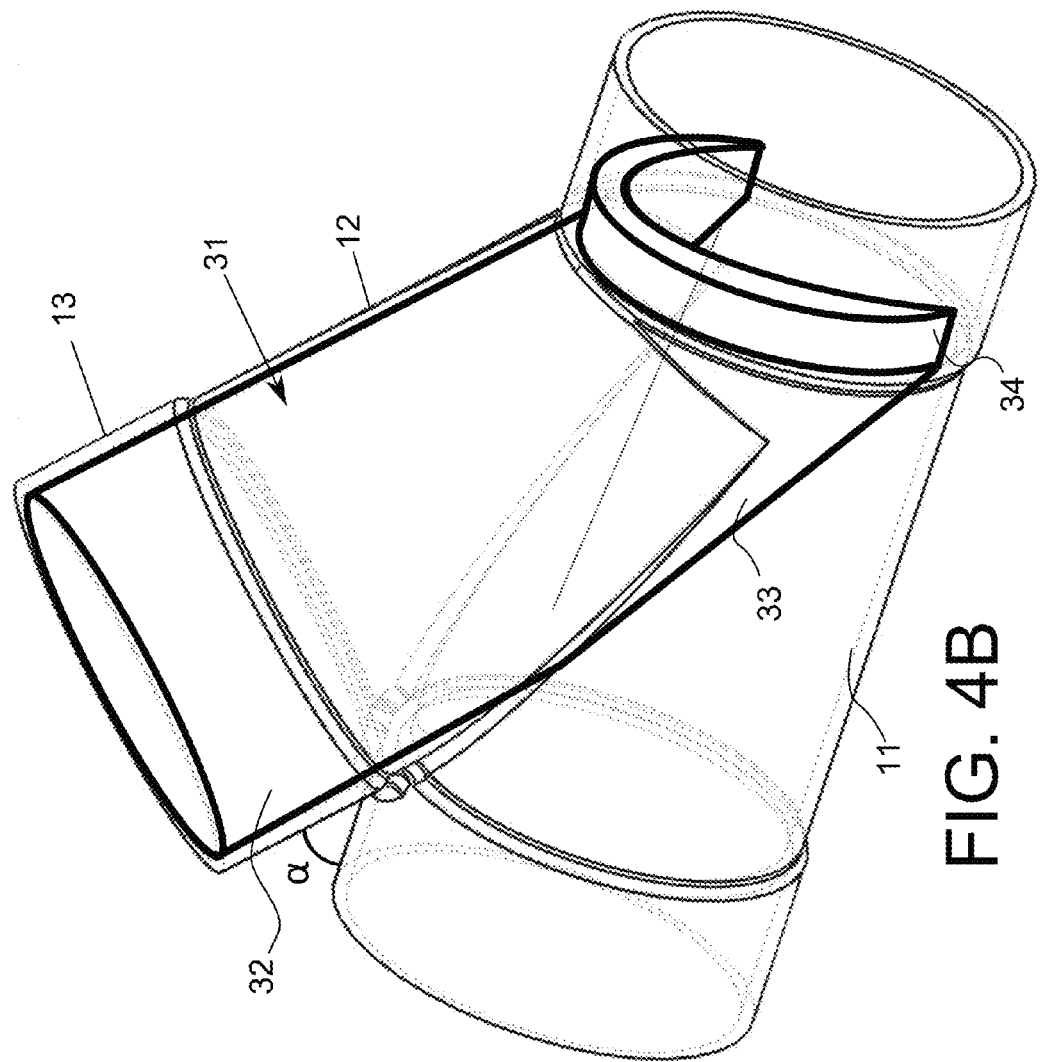
FIG. 4B shows the odour trap of FIG. 4A in the position allowing passage.

FIGS. 2A and 2B show a first preferred embodiment of an odour trap 21. FIGS. 4A and 4B show a second preferred embodiment of an odour trap 31.

In both preferred embodiments the respective odour traps 21 and 31 comprise a respective mounting part 22, 32 configured for releasable mounting in side branch 12. The respective membranes 23 and 33 are arranged on an end of the mounting part to be oriented toward main branch 12.

In the shown preferred embodiments the respective membranes 23 and 33 are generally tubular. The respective mounting parts 22 and 32 are preferably also generally tubular.

Odour trap 21, 31 is preferably formed integrally. Mounting part 22, 32 can take an at least partially solid form. If mounting part 22, 32 takes a hollow form, the wall thickness of the membrane is preferably smaller than the wall thickness of the mounting part.

Mounting part 22, 32 is provided at an end remote from the membrane with mounting means for co-action with a closing cap 13 of side branch 12. The mounting means preferably comprise a sealing ring (not shown) to be received in closing cap 13.

Membrane 23, 33 is provided at an end remote from the mounting part with a peripheral edge 24, 34 which lies sealingly against the inner wall of main branch 11 in the closing position.

Peripheral edge 34 of the second preferred embodiment of odour trap 31 is formed as a collar. Collar 34 is preferably arranged concentrically in main branch 11.

Figure 3B:
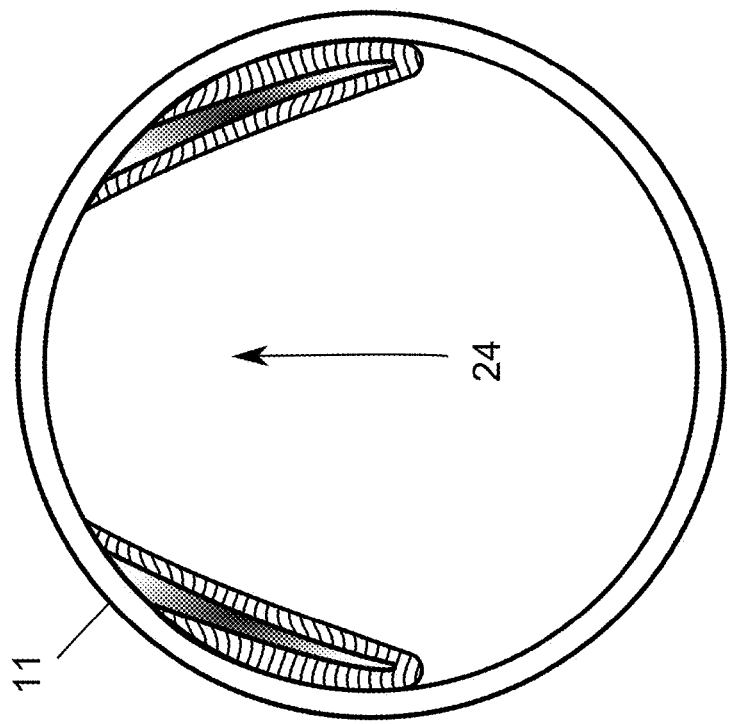
FIG. 3B shows a schematic cross-section through a part of the odour trap of FIG. 2B.
Figure 3A:
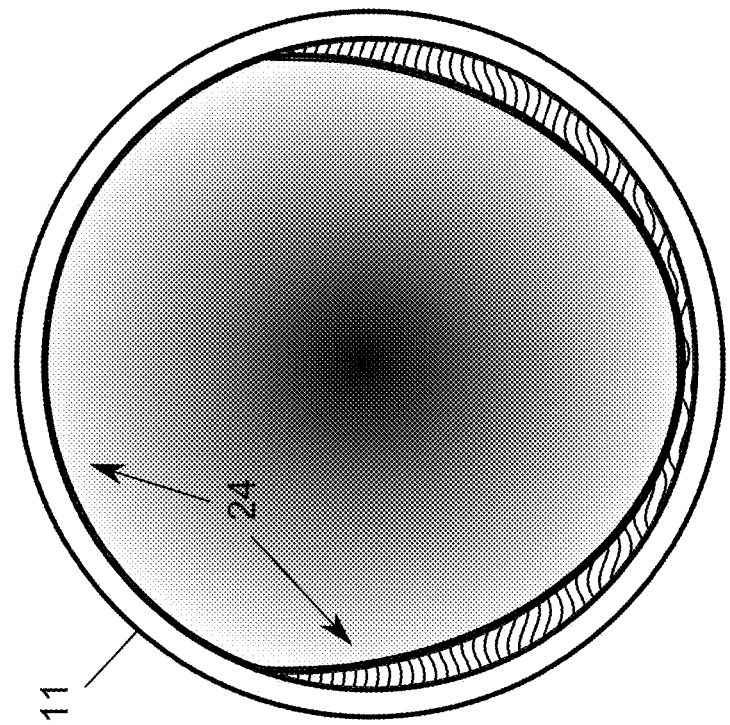
FIG. 3A shows a schematic cross-section through a part of the odour trap of FIG. 2A.

FIGS. 3A and 3B illustrate a schematic cross-section through the main branch at the position of peripheral edge 24 of odour trap 21 in the first preferred embodiment. In the closing position (shown in FIG. 3A) peripheral edge 24 lies against the inner wall of main branch 11 in order to close the passage thereof. In the position allowing passage (shown in FIG. 3B) membrane 23 moves away from the wall of main branch 11 and membrane 23 is folded double against the opening of side branch 12 and thus provides free passage for the fluid. Peripheral edge 24 is here partially received in the side branch, whereby a large passage results in the main branch.

In the second preferred embodiment the membrane comprises a first membrane part 33 to be received in side branch 12 and a second membrane part 34 to be received in main branch 11. Second membrane part 34 lies at an angle relative to first membrane part 33. This angle is equal to the angle α between side branch 12 and main branch 11. The membrane has a kink and fits optimally in the transport conduit at the position of the division.

Both the first and the second membrane parts are tubular. The membrane parts are mutually connected by means of a connecting bend. The angle of the connecting bend is determined by the angle between the side branch and the main branch and is between 0 and 90 degrees. In some cases the connecting bend can be formed by multiple flat pieces and therefore comprise multiple angles. This will occur particularly in the case of connecting bends with a relatively large diameter.

Figure 5B:
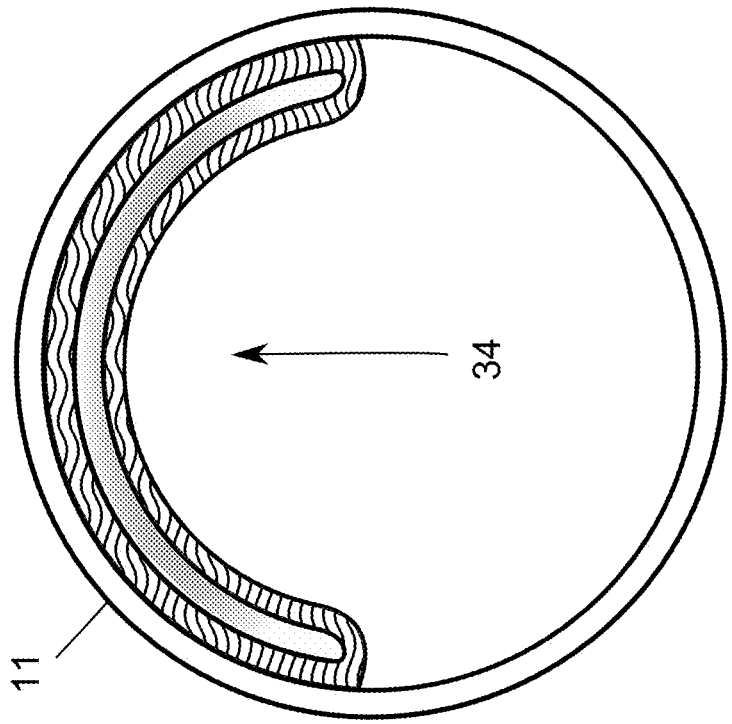
FIG. 5B shows a schematic cross-section through a part of the odour trap of FIG. 4B.
Figure 5A:
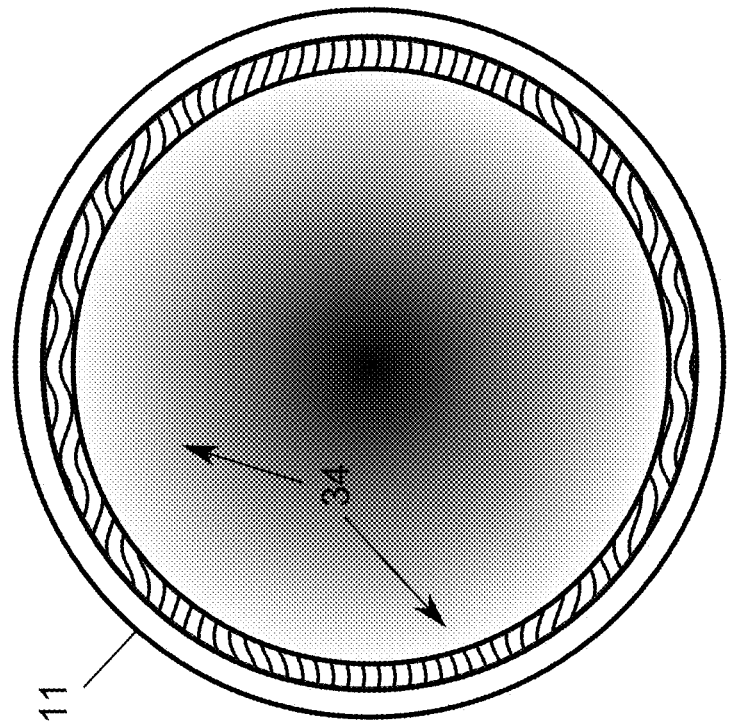
FIG. 5A shows a schematic cross-section through a part of the odour trap of FIG. 4A.

FIGS. 5A and 5B illustrate a schematic cross-section through the main branch at the position of collar 34 of the odour trap in the second preferred embodiment.

In the closing position (shown in FIG. 5A) collar 34 lies against the inner wall of main branch 11 in order to close the passage thereof. In the position allowing passage (shown in FIG. 5B) membrane 33 moves away from the wall of main branch 11 and membrane 33 is folded double against the opening of side branch 12 and thus provides free passage for the fluid.

In both the first and the second preferred embodiments membrane 23, 33 deforms under fluid pressure during movement from the closing position to the position allowing passage. When the fluid pressure decreases, membrane 23, 33 has to return automatically to the closing position and take on its original shape again. In addition, the odour trap according to the invention must be able to withstand the conditions in an outlet pipe, such as (great) temperature differences and a soiled environment. In this context a flexible material, such as polyurethane or rubber, is a suitable material for both membrane 23, 33 and mounting part 22, 32.

The odour trap according to the invention is expressly not limited to the shown and described preferred embodiments.

The membrane surface need not for instance be closed. A part of a tubular shape, for instance a semi-tubular shape, will suffice. The membrane can however also have a shape other than the shown tubular shape. The shape of the membrane is in general adapted to the shape of the main branch. The membrane is generally embodied as a flap.

In the shown preferred embodiments the shape of the mounting part corresponds to the shape of the side branch. This is not however required.

The shown preferred embodiments relate to application in a sewer system. The odour trap according to the invention is expressly not limited to this application, but can be applied generally as shut-off valve in the transport of liquids and/or gases through a hollow guide with a division into a main branch and a side branch. Such hollow guides can extend both above and under the ground, or be present in equipment. Several examples hereof are tubes or pipes in suction or extraction equipment, such as an oxicator, or feed and discharge conduits of an aeration and venting cover.

The invention therefore extends generally to any embodiment which falls within the scope of the appended claims as seen in the light of the foregoing description and drawings.

The invention claimed is:

1. An odour trap (31) for a transport conduit (10) with a division into a main branch (11) and a side branch (12), wherein the odour trap comprises a mounting part (32) which is configured for releasable mounting in the side branch, and a membrane (33) of elastic material which is arranged on an end of the mounting part to be oriented toward the main branch, wherein the membrane is at least partially movable under pressure of a fluid from a closing position, in which the membrane closes the passage of the main branch to the fluid, to a position allowing passage in which the membrane leaves clear the passage of the main branch for the fluid, wherein the membrane is provided at an end remote from the mounting part with a peripheral edge (34) which lies substantially sealingly against the inner wall of the main branch in the closing position, characterized in that the membrane comprises a first membrane part (33) to be received in the side branch (12) and a second membrane part (34) to be received in the main branch (11), wherein the second membrane part (34) lies at an angle relative to the first membrane part (33), wherein the angle is greater than 0 and less than or equal to 90 degrees, wherein either the shape of the first or of the second membrane part (33, 34) or of both is substantially tubular, wherein the second membrane part (34) is at one end connected to the first membrane part (33) by means of a connecting bend, wherein the connecting bend comprises multiple flat parts.

2. The odour trap as claimed in claim 1, wherein the membrane (33) is provided at an end remote from the mounting part (32) with a collar (34), which in the closing position lies substantially sealingly against the inner wall of the main branch (11).

3. The odour trap as claimed in claim 2, wherein in the closing position the collar (34) extends substantially concentrically in the main branch (11).

4. The odour trap as claimed in claim 1, wherein the shape of the mounting part (32) corresponds at least partially to the shape of the side branch (12).

5. The odour trap as claimed in claim 4, wherein the mounting part (32) is generally tubular.

6. The odour trap as claimed in claim 1, wherein the odour trap is formed integrally.

7. The odour trap as claimed in claim 6, wherein the wall thickness of the membrane (33) is smaller than the wall thickness of the mounting part (32).

8. The odour trap as claimed in claim 1, wherein either the membrane (33) or the mounting part (32) or both comprise a flexible material such as polyurethane or rubber.

9. The odour trap as claimed in claim 1, wherein the mounting part (32) is provided with mounting means for co-action with a closing cap (13) of the side branch (12).

10. The odour trap as claimed in claim 9, wherein the mounting means comprise a sealing ring.

11. A system of a transport conduit (10) with a division into a main branch (11) and a side branch (12) and an odour trap (31), for a transport conduit (10) with a division into a main branch (11) and a side branch (12), wherein the odour trap comprises a mounting part (32) which is configured for releasable mounting in the side branch, and a membrane (33) of elastic material which is arranged on an end of the mounting part to be oriented toward the main branch, wherein the membrane is at least partially movable under pressure of a fluid from a closing position, in which the membrane closes the passage of the main branch to the fluid, to a position allowing passage in which the membrane leaves clear the passage of the main branch for the fluid, wherein the membrane is provided at an end remote from the mounting part with a peripheral edge (34) which lies substantially sealingly against the inner wall of main branch in the closing position, wherein the membrane comprises a first membrane part (33) to be received in the side branch (12) and a second membrane part (34) to be received in the main branch (11), wherein the second membrane part (34) lies at an angle relative to the first membrane part (33), which angle is substantially equal to an angle (a) between the side branch (12) and the main branch (11), wherein the angle α between the side branch (12) and the main branch (11) is greater than 0 and less than or equal to 90 degrees, wherein either the shape of the first or of the second membrane part (33, 34) or of both is substantially tubular, wherein the second membrane part (34) is at one end connected to the first membrane part (33) by means of a connecting bend, wherein the connecting bend comprises multiple flat parts.

\* \* \* \* \*